(12) United States Patent
Chang et al.

(10) Patent No.: US 9,704,027 B1
(45) Date of Patent: Jul. 11, 2017

(54) GESTURE RECOGNITION

(75) Inventors: Samuel Henry Chang, San Jose, CA (US); Sowmya Gopalan, Cupertino, CA (US); Ning Yao, Cupertino, CA (US); Yuhua Zhu, Fremont, CA (US)

(73) Assignee: Amazon Technologies, Inc., Seattle, WA (US)

(*) Notice: Subject to any disclaimer, the term of this patent is extended or adjusted under 35 U.S.C. 154(b) by 259 days.

(21) Appl. No.: 13/405,621

(22) Filed: Feb. 27, 2012

(51) Int. Cl.
*G06K 9/00* (2006.01)
*G06T 7/20* (2017.01)

(52) U.S. Cl.
CPC ............ *G06K 9/00355* (2013.01); *G06T 7/20* (2013.01); *G06K 2209/21* (2013.01); *G06T 2207/30196* (2013.01)

(58) Field of Classification Search
CPC .. G06K 9/00355; G06K 2209/21; G06T 7/20; G06T 2207/30196
See application file for complete search history.

(56) References Cited

U.S. PATENT DOCUMENTS

| | | | |
|---|---|---|---|
| 5,454,043 A * | 9/1995 | Freeman | A61B 5/1121 345/419 |
| 6,681,031 B2 * | 1/2004 | Cohen et al. | 382/103 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,351,651 B2 * | 1/2013 | Lee | G06F 3/017 382/103 |
| 8,437,506 B2 * | 5/2013 | Williams et al. | 382/103 |
| 8,491,135 B2 * | 7/2013 | Brown | G06F 3/0425 250/221 |
| 2004/0193413 A1 * | 9/2004 | Wilson | G06F 3/017 704/243 |
| 2007/0118820 A1 * | 5/2007 | Hatakeyama | G06F 3/0304 715/863 |
| 2011/0110560 A1 * | 5/2011 | Adhikari | G06F 3/017 382/103 |
| 2011/0181553 A1 * | 7/2011 | Brown | G06F 3/0425 345/175 |
| 2011/0262002 A1 * | 10/2011 | Lee | G06F 3/017 382/103 |
| 2012/0068917 A1 * | 3/2012 | Huang | G06F 3/017 345/156 |
| 2012/0223885 A1 | 9/2012 | Perez | |
| 2012/0275686 A1 * | 11/2012 | Wilson | G06K 9/00355 382/154 |
| 2013/0278504 A1 * | 10/2013 | Tong | G06K 9/00355 345/158 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Katrina Fujita
(74) *Attorney, Agent, or Firm* — Lee & Hayes, PLLC

(57) ABSTRACT

A hand gesture may be characterized mathematically as a set of motion parameters applied to a dynamic motion model. Training may be conducted to compile a library of motion parameter sets corresponding to various gestures. Motion parameters corresponding to observed gestures may than be compared to the library of motion parameter sets to classify the observed gestures.

17 Claims, 5 Drawing Sheets

GESTURE RECOGNITION

BACKGROUND

User interfaces have traditionally relied on input devices such as keyboards, which require physical manipulation by a user. Increasingly, however, it is desired to detect and monitor the physical positions and movements of users within a scene or environment. User motions and gestures can be used in some environments as user commands and inputs to automated systems. In particular, hand gestures may be useful in providing input from a user to a computerized system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques for evaluating and/or classifying motions or gestures of a person's hand within a scene. A hand motion or gesture may be represented by a dynamic motion model characterized by an accompanying set of motion parameters. Observed gestures may be evaluated against a library of reference gestures by comparing their motion parameters.

More specifically, a plurality of reference gestures may be observed, and motion parameters may be estimated for each of the reference gestures. Subsequently, a user may be observed making a particular gesture. Motion parameters of the user gesture may be estimated, and compared with those of the library of reference gestures to identify or classify the user gesture.

A hand motion or gesture may comprise a sequence of poses or pose vectors, where each pose vector indicates the position and orientation of the hand at a particular instance in time. The position and orientation may be specified in relative terms, such as by incremental measurements of the pose parameters with respect to previous poses in the sequence.

A library of reference gestures may be created by conducting training exercises in which people are asked to repeatedly perform particular hand gestures. Each performance of a gesture is observed to produce a corresponding motion sequence. Multiple such observed motion sequences may be averaged or otherwise combined to create a reference sequence corresponding to the gesture. The reference sequence may comprise a nominal sequence of relative pose vectors. Each reference sequence may be analyzed to estimate motion parameters that apply to a dynamic motion model. Multiple sets of motion parameters, corresponding to multiple gestures, may be stored to create a gesture library.

Various types of cameras and sensors may be used to capture images representing the scene and a person's hand within the scene. In some instances, the described techniques may utilize the structured light techniques described in detail in pending U.S. patent application Ser. No. 12/977,924, filed on Dec. 23, 2010 and entitled "Characterization of a Scene with Structured Light", which is incorporated in its entirety herein by reference.

Example Environment

Figure 1:
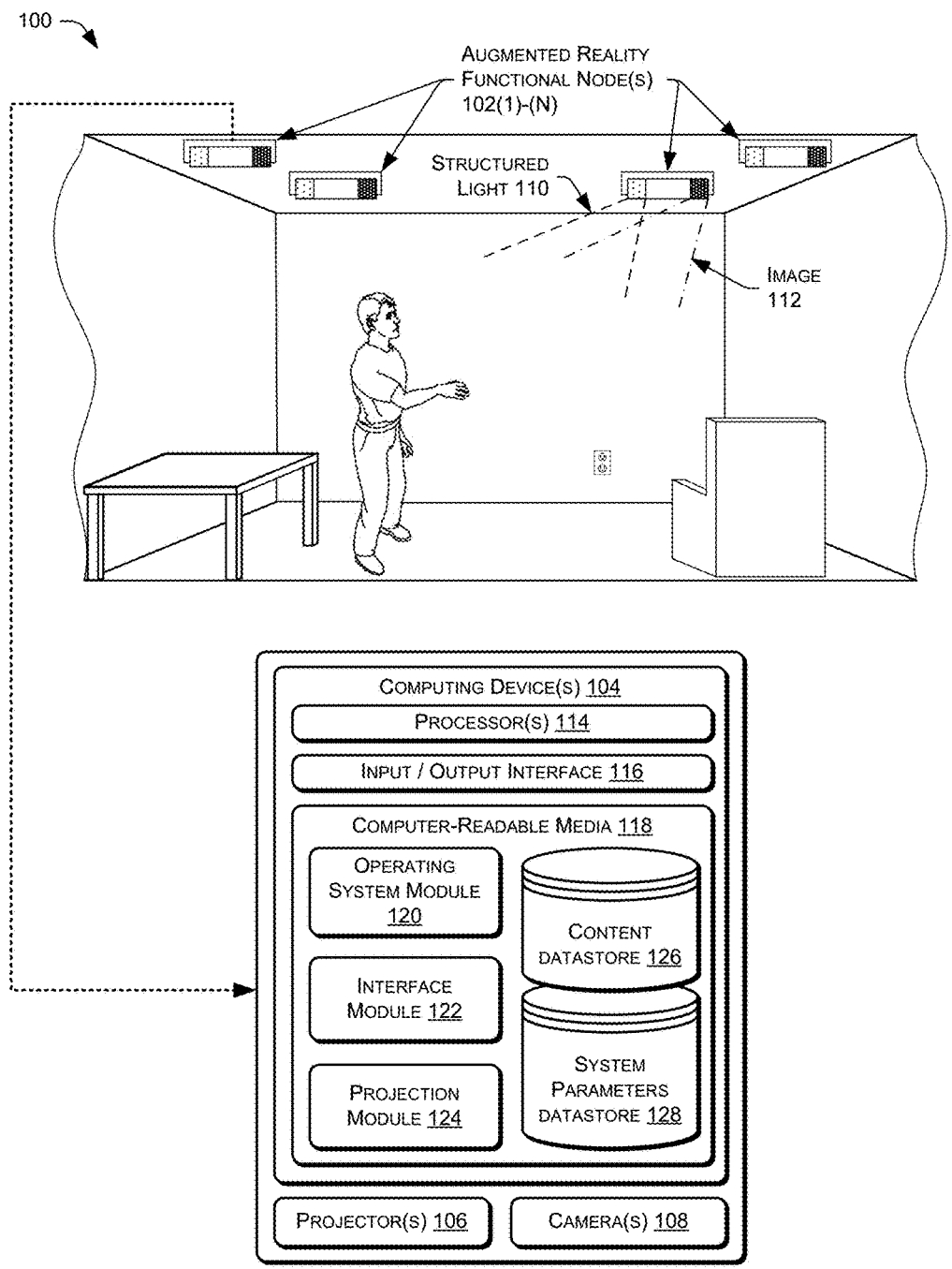
FIG. 1 illustrates an environment that includes an augmented reality functional node (ARFN) and a user that may interact with the ARFN using hand gestures.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more projectors 106 that, when active, project content onto any surface within the environment 100. The projected content may include electronic books, videos, images, interactive menus, or any other sort of visual content.

For instance, a user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

As discussed in further detail below, the ARFN 102 may include one or more cameras 108 that may capture images of the illustrated user operating the UI and, in response, the ARFN 102 may provide feedback to the user and/or may cause performance of actions corresponding to the user's selection. For instance, when the ARFN 102 projects a remote control, the ARFN 102 may provide feedback to the user indicating which button(s) a user is in position to select, may identify a user's selection (e.g., a selection to power on the television) and, in response, may operate the television according to identified selection. While a few examples have been given, it is to be appreciated that the ARFN 102 may project any other sort of content within the environment 100. In addition, the ARFN 102 may recognize and interpret gestures that are made by the user without reference to a UI projected within the environment.

In this example, one of the ARFNs 102 within the environment is shown to project structured light 110. In addition, the ARFN may capture one or more images 112 within the environment for the purpose of identifying distortions in the structured light 110. While FIG. 1 illustrates one ARFN projecting this structured light and imaging the environment to identify the distortions, in some implementations, one or more other ARFNs may additionally or alternatively perform these functions. In either instance, by imaging the environment in this manner, the ARFNs 102 may identify the user's gestures within the environment. Such gestures may be interpreted as instructions or commands to be implemented by the ARFNs 102.

As illustrated, the computing device 104 of the example ARFN 102 includes one or more processors 114, an input/output interface 116, and computer-readable media 118. The processors 114 may be configured to execute instructions, which may be stored in the computer-readable media 118 or in other computer-readable media accessible to the processors 114.

Figure 2:
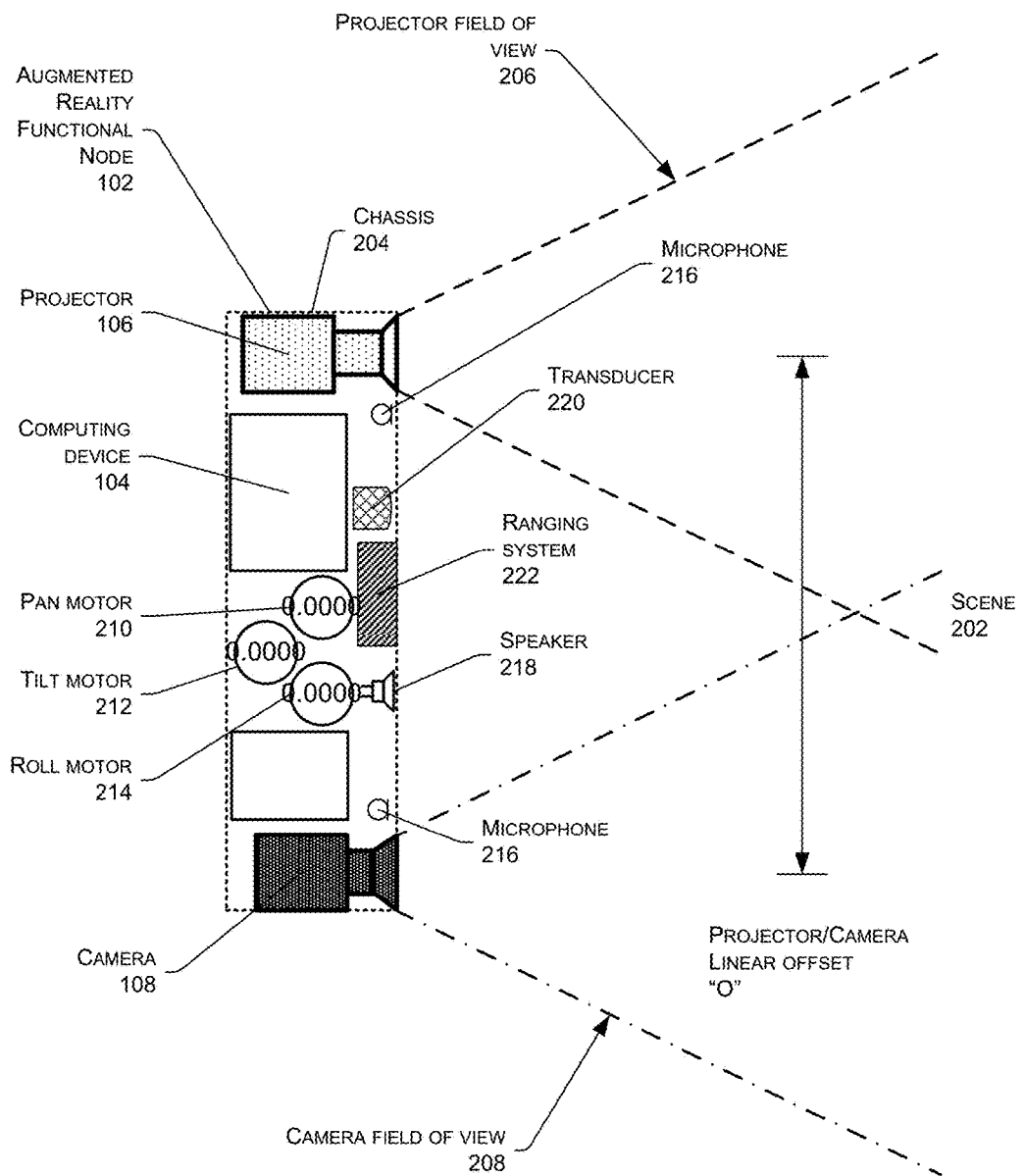
FIG. 2 illustrates an example ARFN that includes a computing device, a projector, a camera, and other selected components for allowing a user to interact with the ARFN with use of gestures interpreted by the ARFN.

The input/output interface 116, meanwhile, may be configured to couple the computing device 104 to other components of the ARFN 102, such as the projector 106, the camera 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106 or the camera 108. Therefore, it is to be appreciated that the illustration of the ARFN 102 of both FIGS. 1 and 2 is for illustrative purposes only, and that components of the ARFN 102 may be configured in any other combination and at any other location.

The computer-readable media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 118 may reside within a housing of the ARFN, on one or more storage devices accessible on a local network, on cloud storage accessible via a wide area network, or in any other accessible location.

The computer-readable media 118 may store several modules, such as instructions, datastores, and so forth that are configured to execute on the processors 114. For instance, the computer-readable media 118 may store an operating system module 120, an interface module 122, a projection module 124, a content datastore 126, and a system parameters datastore 128.

The operating system module 120 may be configured to manage hardware and services within and coupled to the computing device 104 for the benefit of other modules. The interface module 122, meanwhile, may be configured to receive and interpret commands received from users within the environment 100. For instance, the interface module 122 may analyze and parse images captured by the camera 108 to identify hand gestures made by users within the environment 100. In response to identifying a predefined gesture, the interface module 122 may interpret the gesture and cause the ARFN 102 to perform a corresponding action.

For instance, if a user within the environment 100 makes a gesture requesting that the ARFN 102 project a certain piece of content, then the interface module 122 may interpret the gesture and cause the projection module 124 to project the content via the projector 106.

The content datastore 126, meanwhile, stores content for outputting within the environment. For instance, the content datastore may store applications and data for use within the environment 100. The projection module 124 may access the content datastore 126 in order to project requested content within the environment 100. For instance, when the user requests that the ARFN 102 project a particular electronic book, the projection module 124 may access the content datastore 126 to retrieve and cause projection of the desired electronic book.

Finally, the computer-readable media 118 may store the system parameters datastore 128, which is configured to maintain information about the state of the computing device 104, the projector 106, the camera 108, and so forth. For example, and as described in detail below, the ARFN 102 may be configured to pan and tilt for the purpose of allowing the projector 106 and the camera 108 to access different projection surfaces in the environment 100. As such, the system parameters maintained in the datastore 128 may include current pan and tilt settings of the camera and projector, an indication of content that the ARFN 102 is currently projecting or otherwise outputting, and the like.

The system parameter datastore 128 (or another datastore) may further store a library of reference gestures that may be used to interpret user gestures. As illustrated, the user in the room may make gestures with his body, such as hand motions, that can be captured by the cameras. The computing device identifies motion parameters corresponding to the observed gesture. The motion parameters are compared to those of the gesture library. The device then classifies the observed gesture based on the comparison.

Example ARFN

FIG. 2 shows additional details of an example ARFN 102 that may be configured to project a user interface (UI), and to identify and respond to user gestures, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. The projector 106 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth.

The projector 106 has a projector field of view 206 which describes a particular solid angle. The projector field of view 206 may vary according to changes in the configuration of the projector. For example, the projector field of view 206 may narrow upon application of an optical zoom to the projector.

One or more cameras 108 may also be disposed within the chassis 204. The camera 108 is configured to image the scene in visible light wavelengths, non-visible light wavelengths, or both. The camera 108 has a camera field of view 208 that describes a particular solid angle. The camera field of view 208 may vary according to changes in the configuration of the camera 108. For example, an optical zoom of the camera may narrow the camera field of view 208.

In some implementations, a plurality of cameras 108 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 108. For example, in one implementation the actuator may comprise a pan motor 210, a tilt motor 212, a roll motor 214, and so forth. The pan motor 210 is configured to rotate the chassis 204 in a yawing motion. The tilt motor 212, meanwhile, is configured to change the pitch of the chassis 204. The roll motor 214 is configured to move the chassis 204 in a rolling motion. By panning, tilting, and/or rolling the chassis 204, different views of the scene may be acquired.

One or more microphones 216 may be disposed within the chassis 204, or elsewhere within the scene 202. These microphones 216 may be used to acquire input from the user, may be used to determine the location of a sound, or may be used to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 218 may also be present to provide for audible output. For example, the speakers 218 may be used to provide output from a text-to-speech module or to playback pre-recorded audio.

A transducer 220 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 222. The ranging system 222 is configured to provide distance information from the ARFN 102 to a scanned object or a set of objects. The ranging system 222 may comprise radar, light detection and ranging (LIDAR), ultrasonic ranging, stereoscopic ranging, and so forth. In some implementations the transducer 220, the microphones 216, the speaker 218, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

FIG. 2 also illustrates a projector/camera linear offset designated as "O". This is a linear distance between the projector 106 and the camera 108. Placement of the projector 106 and the camera 108 at a distance "O" from one another may aid in the recovery of 3D structured light data from the scene. The known projector/camera linear offset "O" may also be used to calculate distances, dimensioning, and otherwise aid in the characterization of objects within the scene 202. In other implementations the relative angle and size of the projector field of view 206 and camera field of view 208 may vary. Also, the angle of the projector 106 and the camera 108 relative to the chassis 204 may vary.

In other implementations, the components of the ARFN 102 may be distributed in one or more locations within the environment 100. As mentioned above, microphones 216 and speakers 218 may be distributed throughout the scene. The projector 106 and the camera 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

3D Analysis Using Structured Light Pattern

Figure 3:
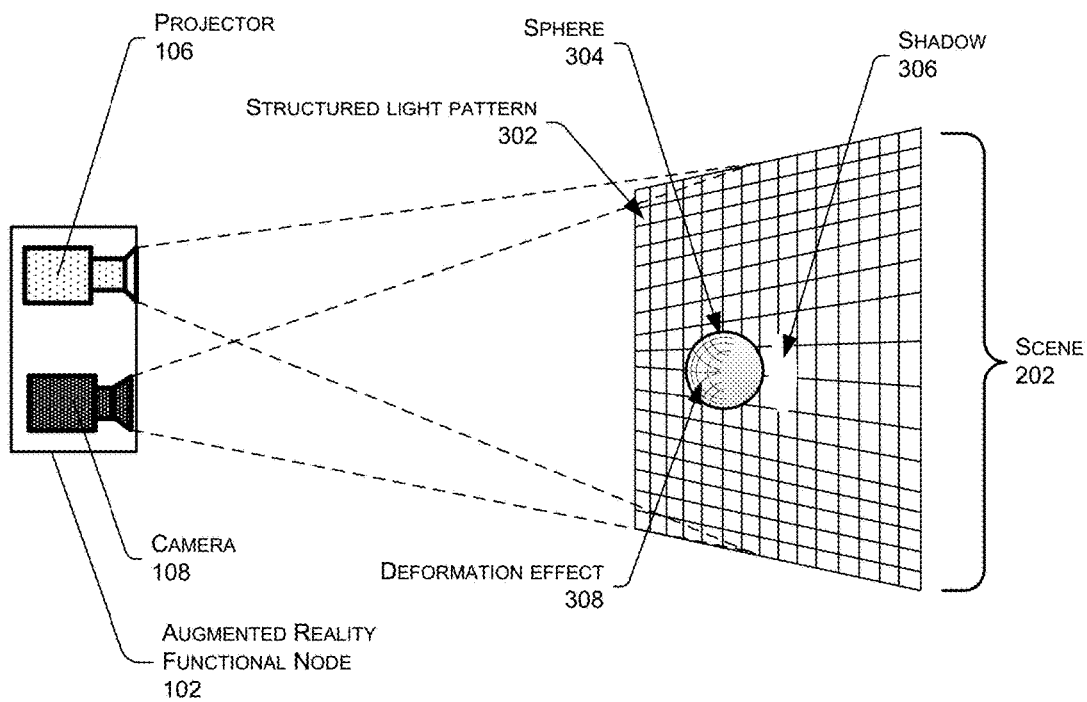
FIG. 3 is an illustrative diagram of the ARFN using structured light to identify surfaces, objects, and user interactions within an environment. By identifying user interactions, the ARFN is able to determine when a user is requesting that the ARFN perform a specified action.

FIG. 3 is an illustrative diagram of the ARFN 102 using structured light to identify 3D information regarding users, user hands, and other objects within an environment. However, while the structured light techniques described herein provide one example for obtaining 3D information regarding these objects, it is to be appreciated that 3D information may be determined in other manners in other embodiments.

In the instant illustration, the projector 106 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 108 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths that are visible to the user, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some implementations, a plurality of structured light patterns 302 may be used to image the scene. These may include different PN patterns, geometric shapes, and so forth.

For illustrative purposes, a sphere 304 is shown positioned between the projector 106 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302, may be used to provide information on the topology of the scene. Where the projector 106 and camera 108 have differing fields of view, such as shown in FIG. 2, the dispersion or change in the "density" of the structured light pattern 302 may be used to determine depth of field.

The camera 108 detects the interaction of the structured light pattern 302 with objects within the scene. For example, the deformation effect 308 on the sphere 304 is detected by the camera 108. The camera may similarly identify deformation effects on users within the environment and may utilize this information to identify user gestures and how trajectories of these gestures. That is, the camera 108 may identify, via deformation in the structured light, a location of a selection tool (e.g., a user's finger) as this location changes over time. The ARFN 102 may then use these locations tracked over time to identify a trajectory of the gesture.

Detecting Hand Poses

Figure 4:
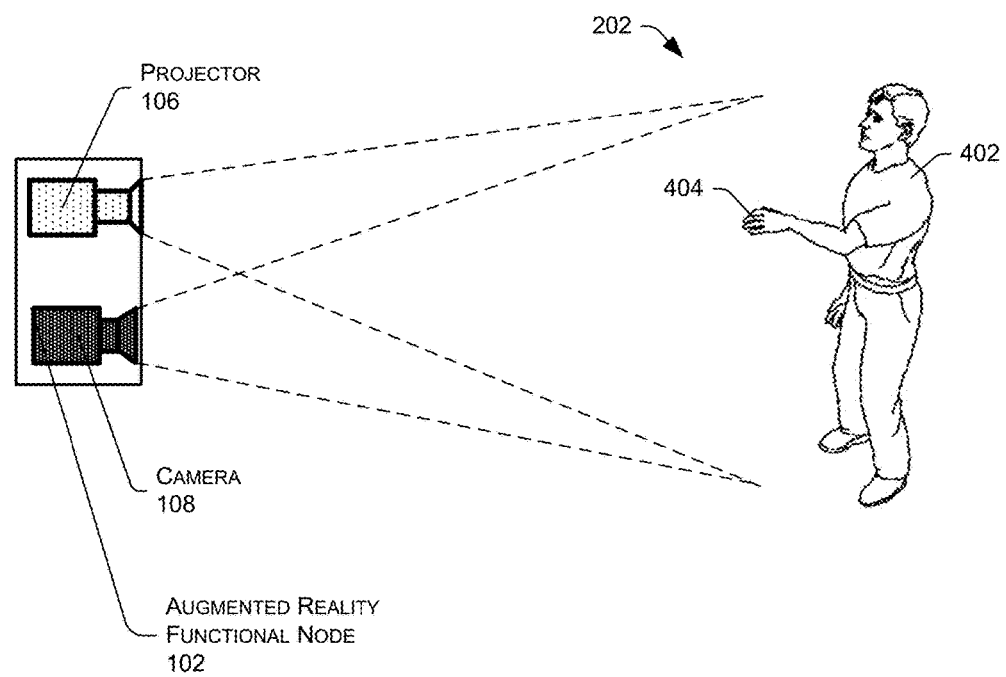
FIG. 4 is an illustrative diagram of the ARFN detecting the pose of a hand within an environment.

FIG. 4 illustrates an example of how the ARFN 102 may be used to observe and identify hand gestures within the scene 202. FIG. 4 shows a person 402 and the person's hand 404 as examples of objects within the environment 100 that may be analyzed by the ARFN 102.

In order to identify hand gestures, the ARFN 102 detects and tracks the hand 404 within the environment or scene 202. Specifically, the ARFN 102 may identify a sequence of hand positions or poses that form a hand gesture. A hand gesture may be defined by a series of poses of the hand 404, where each pose indicates the 3D position of the hand 404 and the 3D angular orientation of the hand 404. Position and angular orientation may be evaluated as absolute positions and orientations or as relative positions and orientations.

As an example, 3D position coordinates may be specified relative to orthogonal X, Y, and Z axes. 3D angular orientations may be specified as rotations about the X, Y, and Z axes.

As described above, the camera 108 may be used in conjunction with a structured light pattern projected by the projector 106 to capture 3D information regarding objects within the scene 202. Specifically, the projector 106 may project a structured light pattern onto the scene 202, and the camera 108 may capture a 2D image or array that indicates the resulting reflected light pattern, which is potentially distorted by objects within the scene 202. The reflected light pattern can be analyzed to reconstruct 3D characteristics or models of objects within the environment 100.

In addition to being used to observe a reflected light pattern, as described above, the camera 108 of the ARFN 102 may be used to capture 2D images of the scene 202. For example, the camera 108 may be used in conjunction with ambient lighting, with or without further illumination by the projector 106, to capture a 2D image of the environment 100. The captured 2D image may be a color or greyscale image, comprising an array of pixels defined by tone or color intensities.

As described above, the projector 106 may be configured to project non-visible light, or light of a specific wavelength that can be filtered by the camera 108 or by electronics associated with the camera 108. This may allow the ARFN 102 to obtain, from a single image capture, a 2D color image of the scene 202 and a 2D pattern image of the projected light pattern as reflected by any objects within the scene 202, such as the person 402 and/or the person's hand 404.

Note that certain embodiments may implement 3D shape detection, analysis, and reconstruction using techniques that do not involve the projection and/or analysis of structured light. Accordingly, it should be understood that structured light analysis is described as but one example of various 3D analysis techniques that may be used to identify 3D shapes within a scene or within regions of a scene.

Figure 5:
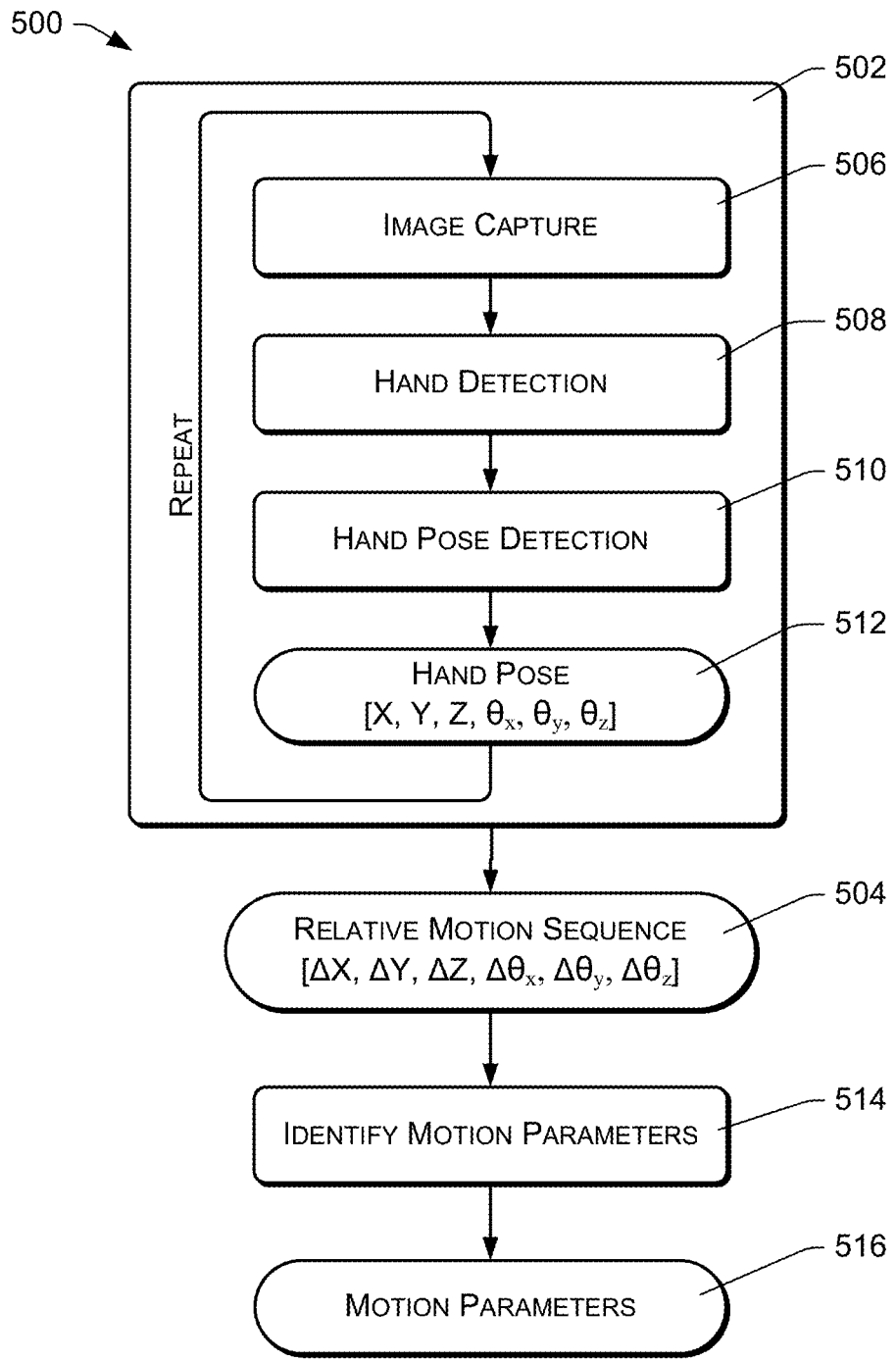
FIG. 5 illustrates an example flow diagram of an ARFN analyzing or monitoring a scene or environment to identify a motion sequence corresponding to a hand gesture made by the user within the scene or environment.

FIG. 5 illustrates an example method 500 of calculating or identifying motion parameters corresponding to a motion or gesture of the hand 404 or other object within the scene 202. The method 500 will be described as being performed in the environment described above with reference to FIGS. 1-4. However, the method 500 may be performed in other environments, using other means of image capture and/or scene analysis.

An action 502 comprises calculating or identifying the pose of the hand 404 within the scene 202 and generating a relative motion sequence 504. The actions within action 502 are performed repetitively, with respect to subsequent images or frames corresponding to successive instances in time. Generally, the action 502 comprises capturing a sequence of images showing a gesture made by a hand of a user and determining sequential poses of the hand based on the images.

Each repetition of the action 502 more specifically comprises an action 506 of capturing one or more images of the scene 202, including those parts or regions of the scene 202 that may contain the hand 404. In the described embodiment, the one or more images may be 2D images captured by the camera 108. The one or more images may also include other data objects, such as images containing 3D information corresponding to the scene 202. For example, certain captured images may show a reflected light pattern, based on a structured light pattern that is projected by the projector 106. 3D information or characteristics regarding the scene may be obtained by analyzing the reflected light pattern.

Alternatively, or in addition, the captured images may include images of the scene 202 taken from different perspectives, which may be analyzed in comparison to each other to reconstruct 3D characteristics of the scene 202.

An action 508 may comprise detecting the presence and/or location the hand 404 within the scene 202, based on the one or more captured images resulting from the action 506. For example, various types of shape analysis, including 2D and/or 3D techniques, may be performed to identify the position of the hand 404 within the scene 202.

An action 510 may comprise detecting or calculating the hand pose 512 of the hand 404 relative to the scene 202. The hand pose 512 may be specified in terms of position and orientation in three dimensions. Position may be specified by linear measurements with respect to orthogonal 3D axes such as X, Y, and Z. Orientation may be specified by angular measurements around the 3D axes, such as by the angles $\theta_x$, $\theta_y$, and $\theta_z$, corresponding to angular measurements with respect to the X, Y, and Z axes, respectively. Thus, an individual hand pose may be indicated or specified by the vector [X, Y, Z, $\theta_x$, $\theta_y$, $\theta_z$].

The relative motion sequence 504 may be calculated as differences between successive hand poses. For example, the relative motion sequence 504 may comprise a stream or sequence of relative motion vectors [$\Delta X$, $\Delta Y$, $\Delta Z$, $\Delta\theta_x$, $\Delta\theta_z$], where each parameter indicates the difference ($\Delta$) from the corresponding parameter of the previous vector.

Based on the relative motion sequence 504, an action 514 may comprise identifying a mathematical motion function and a corresponding set of function parameters 516 that describe the user gesture and corresponding relative motion sequence 504.

The motion of the user's hand can be described as a continuous-time movement. Such continuous movement can be characterized by continuous-time system dynamics, and can be described by a dynamic motion model comprising a set of state equations.

A dynamic motion model can be associated with a matrix or set of parameters, referred to herein as motion parameters, in order to model or describe a particular gesture. In the described embodiment, the action 514 estimates motion parameters 516 that minimize differences between the output of a dynamic motion model and the observed motion vectors of the motion sequence 504. Specifically, such motion parameters 516 may be estimated using recursive least squares (RLS) parameter identification.

Appropriate motion modeling and parameter estimation techniques using RLS are discussed in "Rigid Object Motion Parameter Estimation from a Dynamic Image Sequence", Ph.D. dissertation by S. Chang, George Mason University, Fairfax, Va., 1997. Other known methods of motion modeling and motion parameter estimation may also be used.

The parameter set 514 may be applied to a motion function or set of state equations, as defined by the dynamic motion model, to define or describe the 3D motion of any particular gesture. Therefore, the motion parameters 514 can be thought of as representing such a user gesture.

Figure 6:
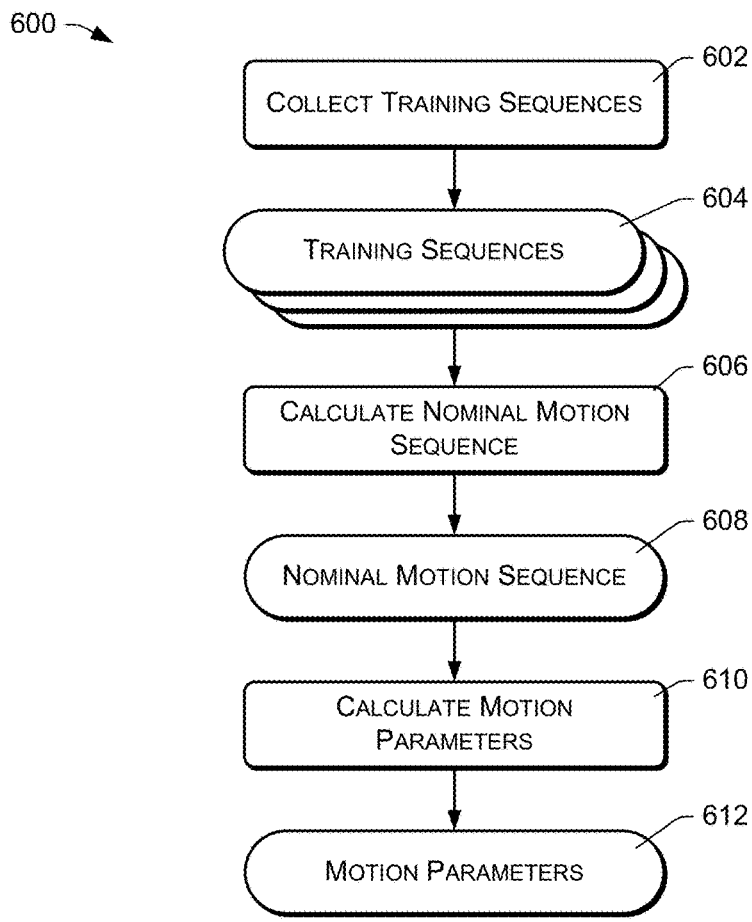
FIG. 6 illustrates an example flow diagram of an ARFN creating reference sequences based on gestures made by a user during training.

FIG. 6 illustrates an example method 600 of calculating or generating a training-based reference sequence for use in classifying observed user gestures. The method 600 may be performed with respect to multiple gesture types or classifications to generate a library of motion parameters corresponding to multiple reference gestures, against which observed gestures may be compared.

An action 602 comprises observing and/or collecting multiple training motion or pose sequences 604, corresponding to multiple observations of one or more users performing the same gesture or gesture type. Each training sequence 604 may comprise a relative motion sequence 504, which has been generated as described above with reference to FIG. 5.

An action 606 may comprise processing the multiple training sequences 604 to calculate and/or create a nominal motion sequence 608. For example, the training sequences 604 may be averaged or subjected to other statistical analysis to create a series of X=[$\Delta X$, $\Delta Y$, $\Delta Z$, $\Delta\theta_x$, $\Delta\theta_y$, $\Delta\theta_z$] vectors representing the nominal motion sequence 608.

An action 610 may comprise calculating motion parameters 612 based on the nominal motion sequence. This may be performed by the dynamic motion modeling and estimation techniques described above with reference to FIG. 5.

The motion parameters 612, when applied to a dynamic motion model, represent the nominal motion stream. The method of FIG. 6 may be performed with respect to various different types or classifications of gestures, to create and store a library of motion parameters or motion parameter sets 612 for comparison with motion parameters 516 of observed gestures, as will be described in more detail below with reference to FIG. 7.

Figure 7:
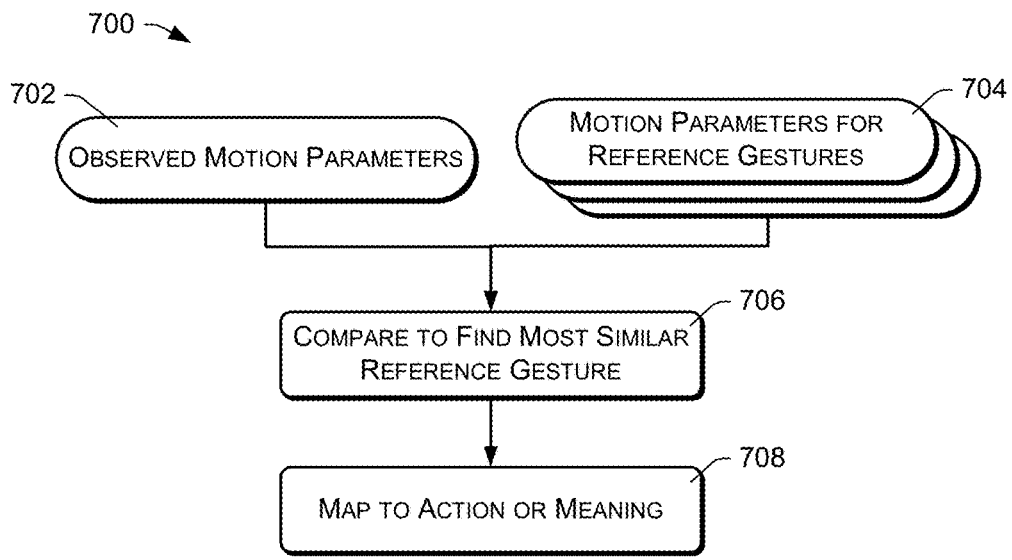
FIG. 7 illustrates an example flow diagram of an ARFN evaluating and taking action in response to a user gesture.

FIG. 7 illustrates an example method 700 of evaluating and acting upon user gestures. The method 700 receives as input motion parameters corresponding to an observed user gesture, and multiple sets of motion parameters 704 corresponding respectively to different reference gestures. The motion parameters 702 of the observed gesture may be obtained by the example method 500 of FIG. 5. The motion parameters 704 of the reference gestures may be compiled or creating by using the method 600 of FIG. 6.

An action 706 comprises comparing the motion parameters 702 of the observed motion with the motion parameters 704 of the reference gestures to find a reference gesture whose motion parameters 704 most closely correspond to the motion parameters 702 of the observed gesture. If M is defined as the number of collection of reference gestures represented by motion parameters 702 and N is defined as the number of parameters of a motion model, then any motion model is a point in an N-dimension space. For a given gesture, assume that the distribution of M in N-dimensional space is Gaussian, then a region representing the given gesture in the N-dimensional space can be defined. An observed motion is detected as a pattern of the given gesture if the N-dimensional point represented the motion falls into the region.

Upon finding a matching gesture, an action 708 may comprise classifying the observed user gesture by mapping an action or meaning to the observed user gesture. For example, the system may be preconfigured to associate respective actions or meanings to each of the referenced gestures. Upon detecting or observing a user gesture corresponding to a particular one of the reference gestures, the system may perform the associated action or interpret the gesture has having the meaning associated with the reference gesture 704.

CONCLUSION

The described hand pose detection techniques may be used by the ARFN 102 or another system to evaluate motions and hand gestures of a person, and to receive instructions or commands from a person. These or similar techniques may be used in conjunction many different types of devices, such general-purpose computers, game systems, industrial systems, and so forth.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system comprising:
   one or more processors; and
   one or more computer-readable media storing computer-
      executable instructions that, when executed by the one or more processors, cause the one or more processors to perform acts comprising:

analyzing a sequence of motions represented by images, the analyzing based at least in part on Gaussian distribution of positional coordinates associated with the sequence of motions;

determining one or more training sequences based at least in part on the sequence of motions;

determining one or more reference gestures based at least in part on the one or more training sequences;

determining, from an observed gesture made by a hand of a user, a first angular orientation of the hand associated with a first pose of the hand;

determining a second angular orientation of the hand associated with a second pose of the hand;

based at least in part on the first angular orientation of the first pose and the second angular orientation of the second pose of the hand, determining motion parameters of the observed gesture, wherein the motion parameters apply to a dynamic motion model;

analyzing the motion parameters based at least in part on the one or more reference gestures; and classifying the observed gesture as one of the one or more reference gestures.

2. The system of claim 1, wherein the dynamic motion model comprises one or more dynamic state equations.

3. The system of claim 1, wherein determining the motion parameters comprises recursive least squares parameter identification.

4. The system of claim 1, wherein determining the first pose of the hand and the second pose of the hand are based at least in part on analyzing a reflection of a pattern projected onto the hand.

5. The system of claim 1, wherein determining the first pose of the hand and the second pose of the hand are based at least in part on a structured pattern reflected from the hand.

6. One or more non-transitory computer-readable media storing computer-executable instructions that, when executed by one or more processors, cause the one or more processors to perform acts comprising:

analyzing a sequence of motions represented by images, the analyzing based at least in part on Gaussian distribution of positional coordinates associated with the sequence of motions;

determining one or more training sequences based at least in part on the sequence of motions;

determining one or more reference gestures based at least in part on the one or more training sequences;

observing a hand gesture of a user;

determining motion parameters of the hand gesture of the user, the motion parameters based on at least a change from a first angular orientation of a hand of the user to a second angular orientation of the hand;

analyzing the motion parameters of the hand gesture of the user with reference to the one or more reference gestures; and associating an action with the hand gesture based at least in part on the one or more reference gestures.

7. The one or more non-transitory computer-readable media of claim 6, wherein the motion parameters of the hand gesture comprise a dynamic motion model including one or more state equations.

8. The one or more non-transitory computer-readable media of claim 6, wherein determining the motion parameters comprises recursive least squares parameter identification.

9. The one or more non-transitory computer-readable media of claim 6, wherein determining the motion parameters of the hand gesture of the user is based at least in part on structured light analysis of a physical environment of the user.

10. A method comprising:

analyzing a sequence of motions represented by images, the analyzing based at least in part on Gaussian distribution of positional coordinates associated with the sequence of motions;

determining one or more training sequences based at least in part on the sequence of motions;

determining one or more reference gestures based at least in part on the one or more training sequences;

determining motion parameters of an observed hand gesture, wherein the motion parameters of the observed hand gesture are based on a change from a first angular orientation of a hand of a user to a second angular orientation of the hand;

analyzing the motion parameters with the one or more reference gestures; and classifying the observed hand gesture.

11. The method of claim 10, wherein the motion parameters apply to a dynamic motion model including one or more state equations.

12. The method of claim 10, wherein determining the motion parameters comprises recursive least squares parameter identification.

13. The method of claim 10, wherein determining the motion parameters is based at least in part on structured light analysis of a sequence of images.

14. The method of claim 10, wherein the determining the motion parameters comprises determining the motion parameters using sequential images captured from different perspectives relative to the user.

15. The method of claim 10, further comprising:

receiving, from one or more microphones, an audio signal representing speech from the user; and characterizing the speech as a command from the user to perform an action or to initiate attention on the user.

16. The method of claim 10, further comprising:

receiving, from a portable signaling device, ultrasonic signals from the user; and characterizing the ultrasonic signals as a command from the user to perform an action or to initiate attention on the user.

17. The method of claim 10, wherein analyzing the sequence of motions comprises averaging parameters corresponding to the sequence of motions.

* * * * *